Jan. 8, 1957 C. P. WEST 2,777,024
METAL-ENCLOSED SWITCHGEAR
Filed April 28, 1951 5 Sheets-Sheet 1

WITNESSES:

INVENTOR
Charles P. West.
BY
ATTORNEY

Jan. 8, 1957  C. P. WEST  2,777,024
METAL-ENCLOSED SWITCHGEAR
Filed April 28, 1951  5 Sheets-Sheet 2

INVENTOR
Charles P. West.
BY
ATTORNEY

Jan. 8, 1957  C. P. WEST  2,777,024
METAL-ENCLOSED SWITCHGEAR
Filed April 28, 1951  5 Sheets-Sheet 3

INVENTOR
Charles P. West
BY
ATTORNEY

Jan. 8, 1957  C. P. WEST  2,777,024
METAL-ENCLOSED SWITCHGEAR
Filed April 28, 1951  5 Sheets-Sheet 4
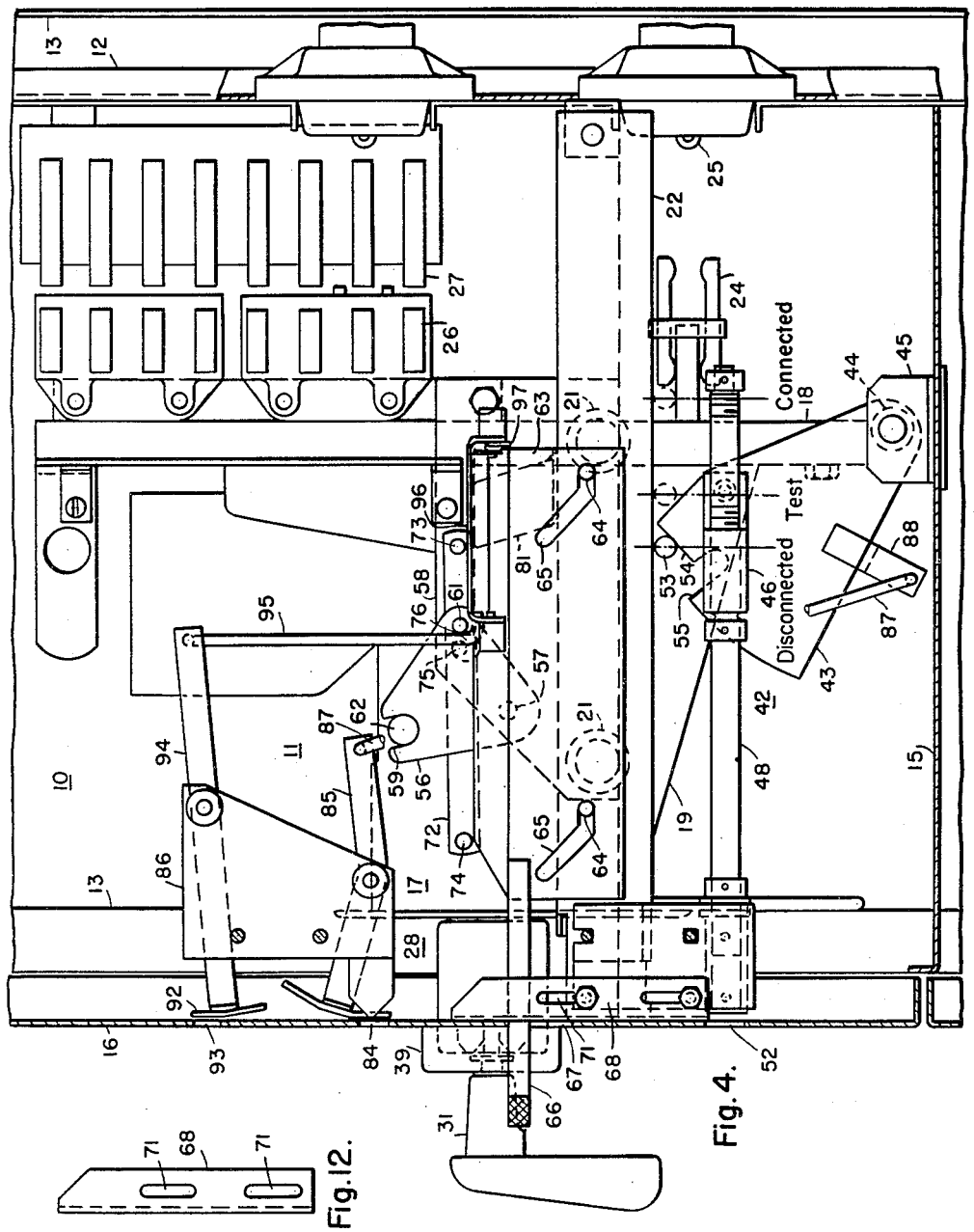
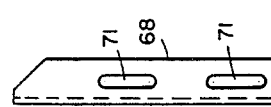
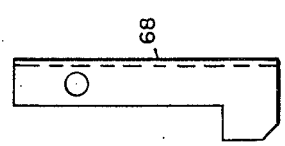
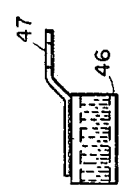
INVENTOR
Charles P. West.
BY 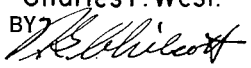
ATTORNEY Jan. 8, 1957  C. P. WEST  2,777,024
METAL-ENCLOSED SWITCHGEAR
Filed April 28, 1951  5 Sheets-Sheet 5

INVENTOR
Charles P. West.
BY
ATTORNEY

United States Patent Office 2,777,024
Patented Jan. 8, 1957

2,777,024

METAL-ENCLOSED SWITCHGEAR

Charles P. West, Forest Hills, Pa., assignor to Westinghouse Electric Corporation, East Pittsburgh, Pa., a corporation of Pennsylvania Application April 28, 1951, Serial No. 223,564

15 Claims. (Cl. 200—50)

My invention relates, generally, to metal-enclosed switchgear, and, more particularly, to switchgear housing units having circuit breakers of the horizontal drawout type disposed therein.

In metal-enclosed switchgear, it is the usual practice to enclose each circuit breaker unit in an individual cell or cubicle having a door through which the breaker may be removed for inspection or replacement. Usually, the cells or cubicles have been so constructed that the door for a cell could be closed only when the breaker unit was fully inserted into the cell to the connected or operating position, and the breaker mechanism could be operated by a handle mounted on the exterior of the door only when the breaker unit was in the operating position.

An object of my invention is to provide a metal-enclosed switchgear structure in which the removable breaker unit can be in either the disconnected, the test or the connected positions in a cell with the door of the cell closed.

Another object of my invention is to provide a drive mechanism for moving the circuit breaker unit in the cell from the disconnected to the test and the connected positions or from the connected to the test and the disconnected positions while the door is closed.

A further object of my invention is to provide protective interlocking for preventing a closed circuit breaker from being moved into or out of the connected or operating position in the cell.

Still another object of my invention is to provide a mechanical interlock for preventing the drive mechanism from being operated while the circuit breaker is closed and for preventing the closing of the breaker while the drive mechanism is being operated.

A still further object of my invention is to provide for making a circuit breaker of the drawout type trip free throughout its range of travel between the connected, the test and the disconnected positions.

Other objects of my invention will be explained fully hereinafter or will be apparent to those skilled in the art.

In accordance with one embodiment of my invention, the cell or cubicle for a circuit breaker unit of the horizontal drawout type is so constructed that the breaker unit can be moved from the connected to the test and the disconnected positions or vice versa with the cell door closed. The breaker can be operated in any one of the three positions with the door closed by means of a handle mounted on the exterior of the door. Mechanical interlocking between the drive mechanism and the breaker operating mechanism prevents a closed breaker from being moved into or out of the operating position.

For a better understanding of the nature and objects of my invention, reference may be had to the following detailed description, taken in conjunction with the accompanying drawings, in which:

Fig. 4 is a view, similar to Fig. 3, the breaker unit being in the disconnected position;

Figs. 11 and 12 are views, in front and side elevation, respectively, of another part of the interlocking means; and Fig. 13 is a view, in plan, of a travelling nut for the drive mechanism utilized in the structure.

Figure 1:
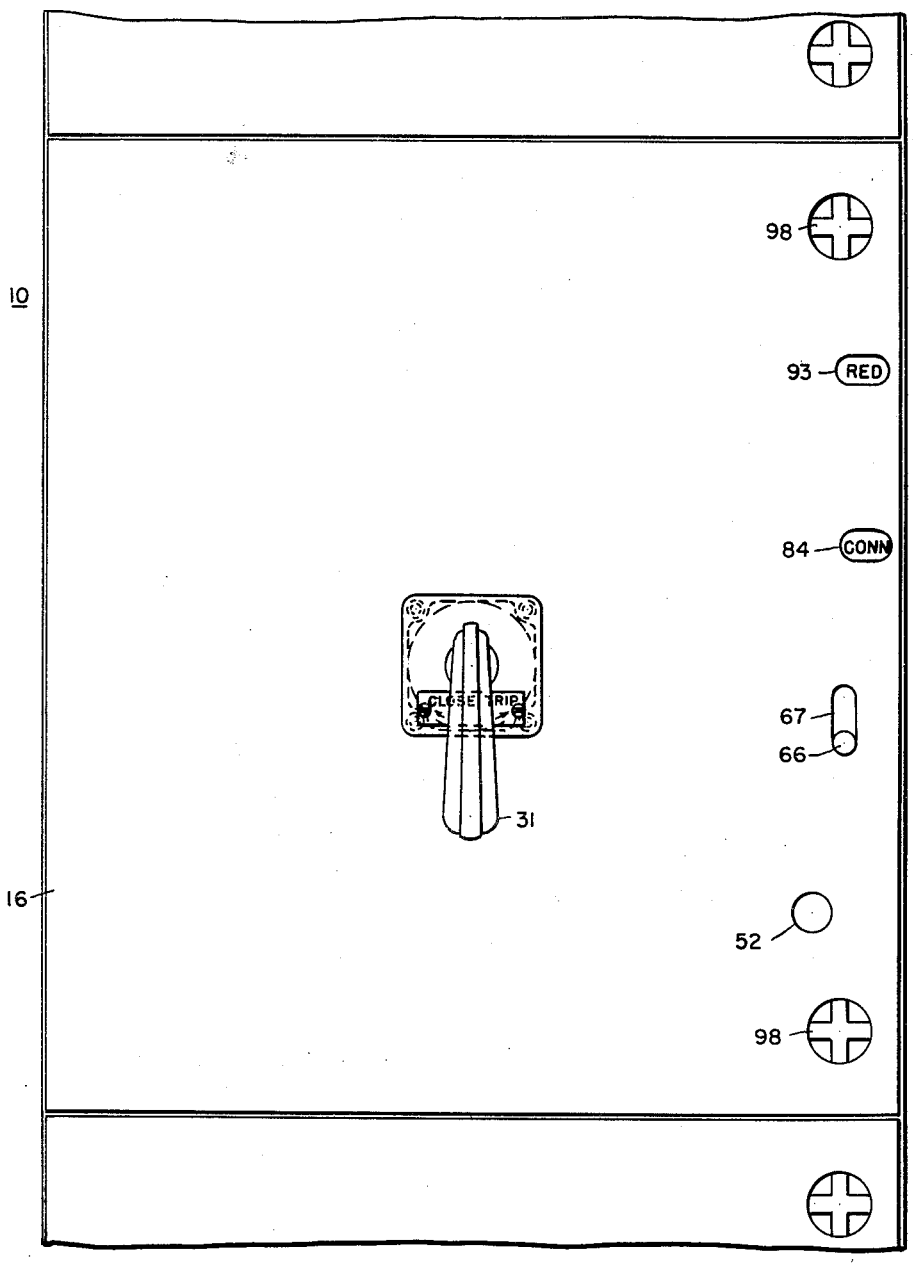
Figure 1 is a view, in front elevation, of a switchgear cell or cubicle structure embodying the principal features of the invention.

Referring to the drawings, the structure shown therein comprises a switchgear cell or cubicle 10, in which is disposed a circuit breaker unit 11. The cubicle 10 comprises angle members 12, flanged side sheets 13, a top wall 14, a bottom wall 15 and a door 16. The cubicle 10 may be part of a metal-enclosed switchgear unit comprising several cubicles of the type shown.

Figure 6:
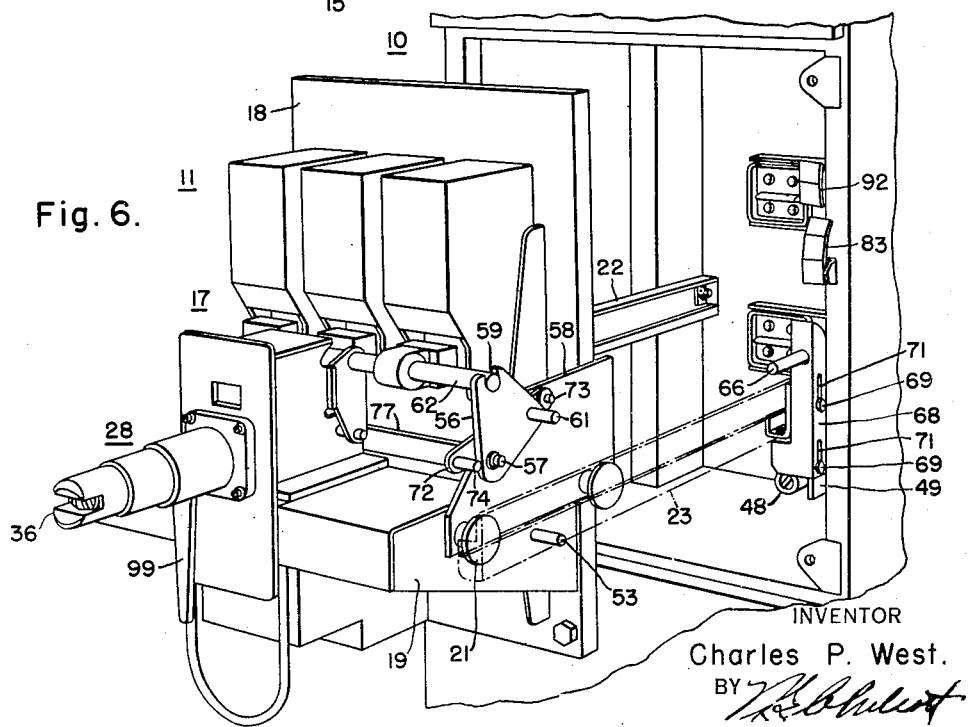
Fig. 6 is a view, similar to Fig. 5, the breaker unit being outside of the cell and supported on rail extensions.

As shown, the circuit breaker unit 11 is of the horizontal drawout type. The circuit breaker unit comprises a circuit breaker 17 which is mounted on a drawout carriage comprising a rear panel 18 and side members 19 attached to the panel 18. The carriage is supported by rollers 21 which run on rails 22 disposed at the sides of the cubicle 10. As shown in Fig. 6, removable rail extensions 23 may be provided for supporting the breaker unit 11 when it is completely withdrawn from the cell 10.

Figure 3:
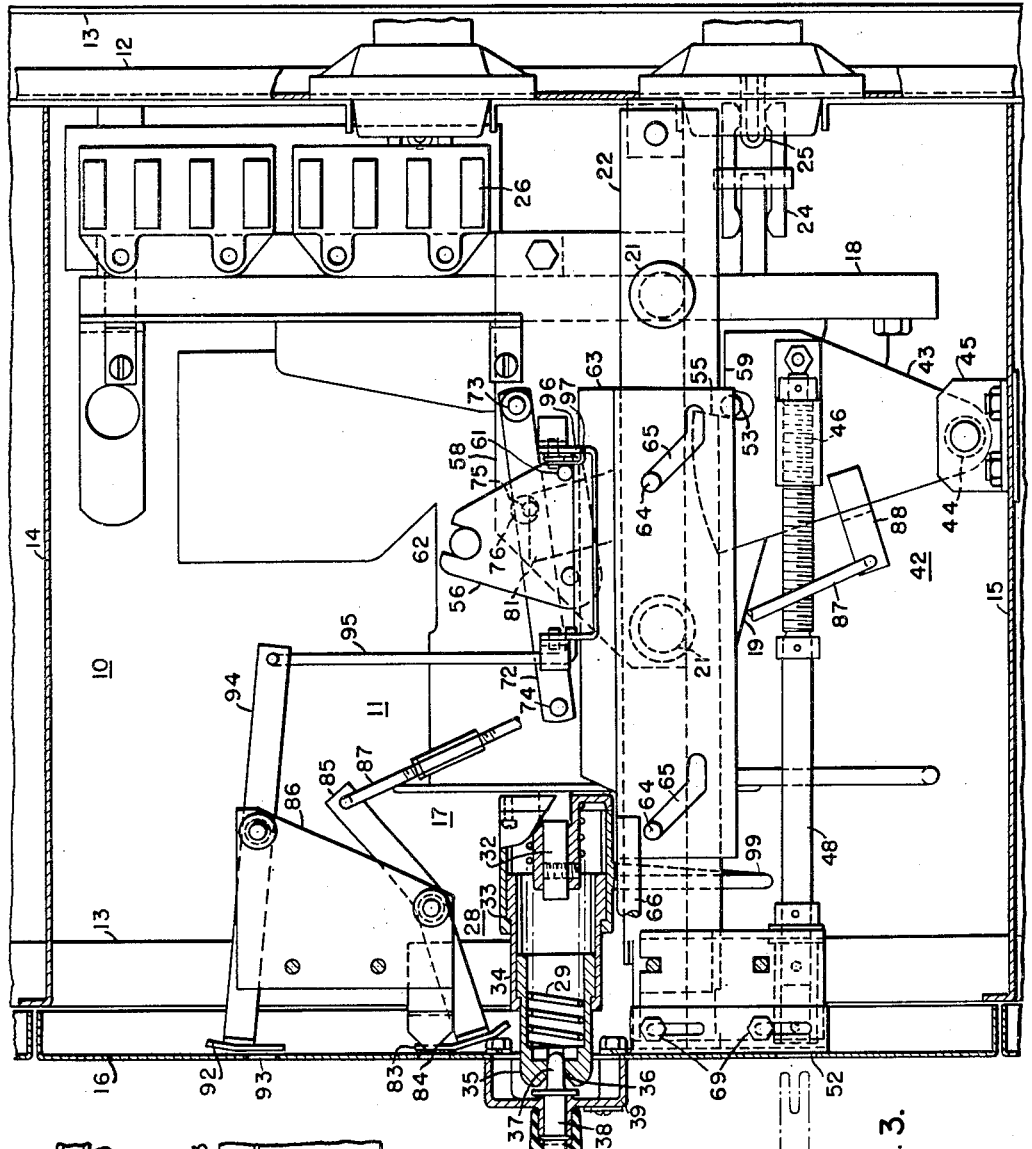
Fig. 3 is a view, partly in side elevation and partly in section, of the structure shown in Fig. 1, the breaker unit being in the connected position.
Figures 9, 10:
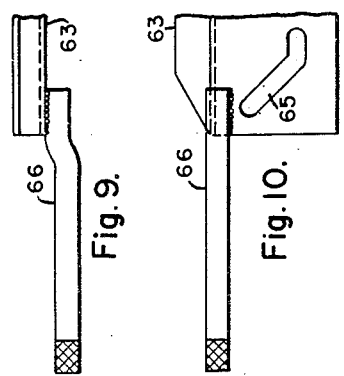
Figs. 9 and 10 are views, in plan and elevation, respectively, of part of the interlocking means utilized in the structure.

As shown most clearly in Fig. 3, the circuit breaker unit 11 is provided with primary disconnecting contact members 24 which engage fixed contact members 25 at the rear of the cell 10 when the breaker unit is in the connected or operating position. As shown in Fig. 4, the primary disconnecting contact members 24 are disengaged from the contact members 25 when the circuit breaker unit is in the disconnected position. The contact members 24 are also disengaged from the contact members 25 when the breaker unit is in the test position.

As described in my copending application, Serial No. 223,563, filed April 28, 1951, now Patent No. 2,689,898, the circuit breaker unit is provided with a plurality of secondary disconnecting contact members 26 which engage fixed secondary contact members 27 in the cell when the breaker unit is in the operating position. The secondary contact members 26 also engage the contact members 27 when the breaker unit is in the test position.

As described in a copending application of H. J. Lingal, Serial No. 223,479, filed April 28, 1951, now Patent No. 2,703,829, a telescopic connecting device 28 is mounted on the circuit breaker 17 and is automatically extended by a spring 29 to connect a handle 31, which is mounted on the exterior of the door 16, to an operating shaft 32 for operating the circuit breaker mechanism. As shown most clearly in Fig. 3, the connecting device 28 comprises an operating member 33 which is secured to the shaft 32 and splined sleeves 34 and 35 which are telescopically disposed in the member 33. The spring 29 is disposed inside the sleeves 34 and 35. A slot 36 is provided in the outer end of the sleeve 35 for receiving a tongue 37 on the inner end of a shaft 38 which is mounted in a bearing bracket 39 on the door 16. The handle 31 is secured to the shaft 38 by means of a set screw 41.

As shown in Fig. 3, the spring 29 automatically extends the telescopic device 28 to maintain the connection between the shaft 32 and the handle 31 as the breaker unit is moved into the cell 10. As shown in Fig. 4, the telescopic device 28 is fully retracted when the breaker unit is moved to the disconnected position with the door 16 closed. In this manner, the circuit breaker may be operated by means of the handle 31 when the door 16 is closed and the circuit breaker unit is at the disconnected, the test or the connected positions in the cell. The device 28 is automatically connected to the handle 31 when the door is closed and is automatically disconnected from the handle when the door is opened.

In order that the circuit breaker unit 11 may be moved in the cell when the door 16 is closed, a drive mechanism 42 is provided for moving the circuit breaker unit 11 from the disconnected to the test position and then to the connected position, or vice versa. As shown most clearly in Fig. 5, the drive mechanism 42 comprises a pair of spaced plates 43 which are secured to a tie rod 44 rotatably mounted in brackets 45 attached to the bottom 15 of the cubicle 10. The plates 43 are actuated by a traveling nut 46 which is secured to one plate 43 by a bracket 47 and is driven by a shaft 48 rotatably mounted in a bracket 49 which is secured to one side of the cell 10. As indicated by the broken lines in Fig. 3, a crank 51 may be inserted through an opening 52 in the door 16 to drive the shaft 48 under predetermined conditions which will be described more fully hereinafter.

As shown most clearly in Figs. 4 and 6, a pin 53 is provided in each side member 19 of the breaker unit 11. As shown in Fig. 4, the pins 53 engage shoulders 54 on the plates 43 when the breaker unit is inserted into the cell to the disconnected position. Thus, the inward movement of the breaker unit is stopped by the pins 53 engaging the shoulders 54.

In order to move the breaker unit from the disconnected to the test and the connected positions in the cell, it is necessary to rotate the shaft 48 by means of the crank 51. When the shaft 48 is rotated in one direction, the plates 43 are actuated to cause the pins 53 to be engaged by shoulders 55 on the plates 43 thereby driving the breaker unti into the cell. When the shaft 48 is rotated in the opposite direction, the shoulders 54 engage the pins 53 to move the breaker unit out of the cell as far as the disconnected position.

As explained hereinbefore, it is necessary to provide protective interlocking to prevent the drive mechanism from being operated when the breaker is closed and to prevent the closing of the breaker if the crank 51 is in position to operate the drive mechanism. As also explained hereinbefore, it is desirable to make the circuit breaker trip-free throughout its range of travel between the connected, the test and the disconnected positions.

As shown most clearly in Fig. 6, a triangular-shaped plate 56 is pivotally mounted at one corner on a pin 57 secured in a plate 58 which is attached to the panel 18 and the side member 19 of the circuit breaker unit. A notch 59 is provided at another corner of the plate 56 and a pin 61 is secured at the third corner of the triangular plate 56. One end of a cross bar 62 which is connected to the moving contacts of the circuit breaker 17 is disposed in the notch 59 in the plate 56. Thus, the plate 56 is actuated about its pivot point 57 as the contact members of the circuit breaker are opened or closed.

Figure 5:
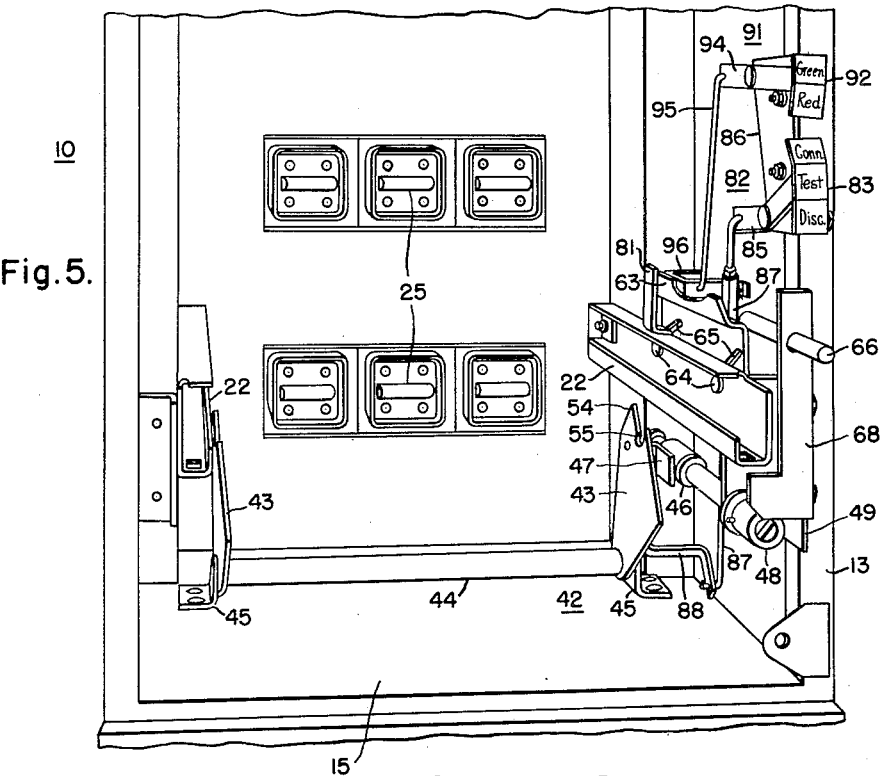
Fig. 5 is a view, in perspective, of a portion of the cell, the breaker unit being entirely removed from the cell.

As shown in Figs. 3, 4 and 5, an interlocking plate 63 is movably mounted on the side of one of the rails 22. The plate 63 is supported by a pair of spaced pins 64 which extend into slots 65 in the plate 63. An actuating rod 66 is attached to the interlocking plate 63 and extends through an opening 67 in the door 16. The plate may be raised from its lowermost position, as shown in Fig. 3, to its uppermost position, as shown in Fig. 4, by pulling on the rod 66. The slots 65 are so shaped that once the plate has been raised to its uppermost position it will remain in that position until lowered by pushing on the rod 66.

Figure 2:
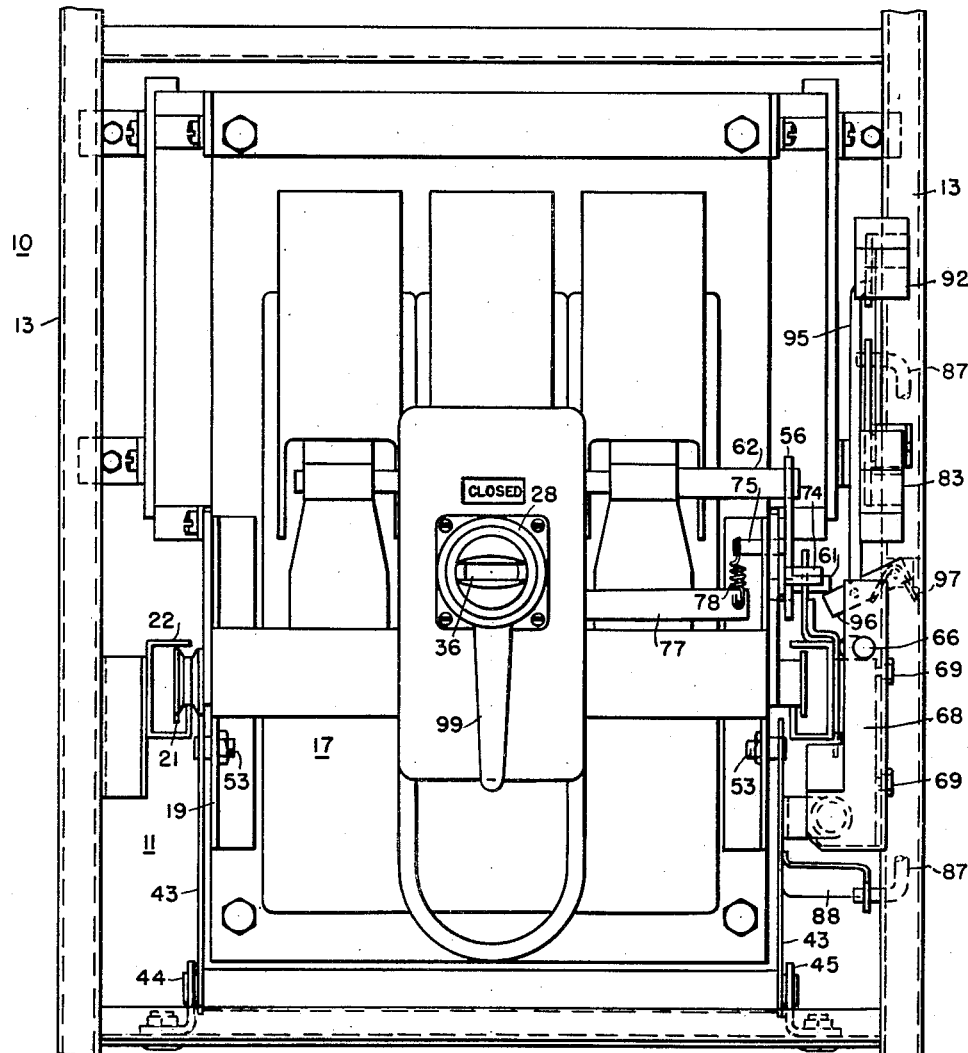
Fig. 2 is a view, similar to Fig. 1, the door of the cell being removed to show the circuit breaker unit.
Figure 7:
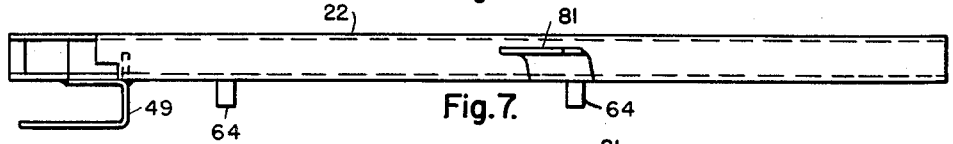
Figs. 7 and 8 are views, in plan and elevation, respectively, of one of the rails for supporting the breaker unit in the cell.
Figure 8:
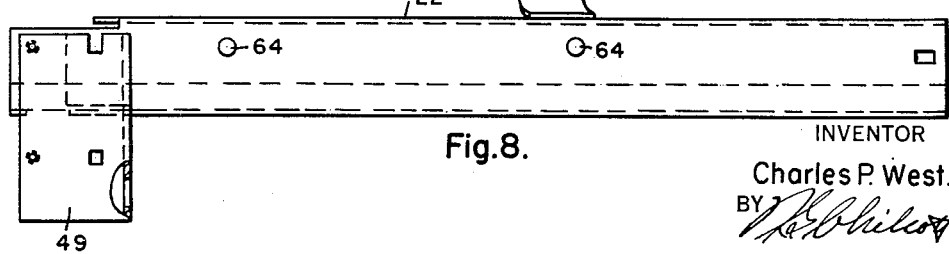

As shown, the rod 66 extends through a slider 68 which is movably mounted on the bracket 49 at one side of the cubicle 10. The slider 68 may be attached to the bracket 49 by screws 69 which extend through slots 71 in the slider 68. As shown in Fig. 2, the lower end of the slider 68 covers the end of the shaft 48 when the slider 68 and the interlocking plate 63 are in their lowermost positions. Thus, the slider 68 prevents the crank 51 from being inserted into the end of the shaft 48 and it is necessary to raise the slider 68 and the interlocking plate 63 before the crank 51 can be inserted into the shaft 48 to rotate the shaft.

As shown in Fig. 3, the pin 61 in the triangular plate 56 is actuated to engage the top of the interlocking plate 63 to prevent this plate from being raised when the contact members of the circuit breaker are closed. Thus, the plate 63 and the slider 68 cannot be raised by means of the rod 66 to permit the crank 51 to be inserted into the end of the shaft 48 to rotate the shaft to operate the drive mechanism 42 when the circuit breaker is closed.

Accordingly, the drive mechanism cannot be operated to withdraw the breaker unit from the connected position when the circuit breaker is closed. Also, the drive mechanism cannot be operated to move the circuit breaker unit from the disconnected or the test positions when the contact members of the circuit breaker are closed. Thus, it is necessary to trip the circuit breaker mechanism to open the contact members of the circuit breaker before the interlocking plate 63 and the slider 68 can be raised to permit the crank 51 to be inserted into the shaft 48.

As shown in Fig. 4, the pin 61 is engaged by the top of the interlocking plate 63 when the contact members of the circuit breaker are open and the interlocking plate is in its uppermost position. Thus, the circuit breaker cannot be closed while the interlocking plate 63 and the slider 68 are in their uppermost positions to permit the rotation of the shaft 48. In order to close the circuit breaker, it is necessary to withdraw the crank 51, thereby permitting the slider 68 and the interlocking plate 63 to be actuated to their lowermost positions.

In order to prevent possible damage to the circuit breaker operating and interlocking mechanisms by attempting to close the breaker when it is being moved between the disconnected, the test and the connected positions, the breaker is made trip-free by means of a member 72 which is pivotally mounted at one end on a pin 73 in the plate 58. A pin 74 in the other end of the member 72 is engaged by the top of the interlocking plate 63 when the interlocking plate is in its uppermost position and the breaker unit is at any point between the disconnected and the connected positions in the cell.

As shown most clearly in Fig. 2, a pin 75 is attached to the member 72 and extends through an opening 76 (see Fig. 4) in the plate 58. The inner end of the pin 75 is connected to a trip bar 77 on the circuit breaker mechanism by means of a spring 78. Thus the trip bar 77 is raised by the member 72 to make the circuit breaker mechanism trip-free when the interlocking plate 63 is in its uppermost position and the breaker unit is between the disconnected and the connected positions in the cell.

As an additional precaution against the possibility of the circuit breaker unit being moved from the test position to the connected position or vice versa while its contact members are closed, a vertically extending member 81 is secured to the top of the right-hand rail 22. The member 81 is so disposed that it will be engaged by the pin 61 on the triangular plate 56 to prevent the breaker unit from being moved from the test position to the connected position while the contact members of the circuit breaker are closed.

Likewise, the pin 61 will engage the member 81 to prevent the circuit breaker unit from being moved from the connected position to the test position while the contact members of the circuit breaker are closed. The member 81 also cooperates with the pin 61 to ensure that once the breaker has been moved past the test position the contact members of the circuit breaker cannot be closed unless the circuit breaker unit is fully inserted into the cell to cause the primary disconnecting contact members to be fully engaged.

A position indicating device 82 is provided for indicating the position of the circuit breaker unit in the cell. The device 82 comprises a target 83 which is visible through an opening 84 in the door 16, an arm 85 pivotally mounted on a plate 86 secured to the side of the cell 10, an adjustable connecting rod 87 and an arm 88 secured to the right-hand plate 43 of the drive mechanism 42. Thus, the target 83 is so operated by the plate 43 that it indicates the position of the breaker unit in the cell.

Another indicating device 91 is provided for indicating whether the contact members of the circuit breaker are open or closed. The device 91 comprises a target 92 which is visible through an opening 93 in the door 16. The target 92 is actuated by an arm 94 pivotally mounted on the plate 86, a rod 95 and a U-shaped bracket 96 which is pivotally mounted on one of the side sheets 13 of the cubicle 10. As shown most clearly in Fig. 2, the pin 61 on the plate 56 engages the bracket 96 to actuate it downwardly when the contact members of the circuit breaker are closed. Thus, the target 92 is raised by means of the rod 95 and the lever arm 94.

In accordance with the usual practice, a portion of the target which is visible through the opening 93 when in its raised position may be painted red to indicate that the circuit breaker contacts are closed. As shown most clearly in Fig. 4, the bracket 96 is released by the pin 61 when the contact members of the circuit breaker are open and the bracket is biased upwardly by a spring 97, thereby lowering the target 92 to cause a portion painted green to be visible through the opening 93, which indicates that the contact members of the circuit breaker are open.

As also shown in Fig. 4, the base of the U-shaped bracket 96 is of sufficient length that it may be engaged by the pin 61 at all positions of the circuit breaker unit between the connected and the disconnected positions. Thus, the target 92 will be operated throughout the range of travel of the circuit breaker unit between the connected and the disconnected positions.

As shown in Fig. 6, the breaker unit 11 may be placed on removable rail extensions 23 in the usual manner. The breaker unit may then be pushed into the cell by hand until the pins 53 engage the shoulders 54 on the plates 43. After the extensions 23 are removed the door 16 may then be closed and secured by means of thumb screws 98. The handle 66 may then be raised, provided the contact members of the circuit breaker are opened, to raise the slider 68 to permit the crank 51 to be inserted in the end of the shaft 48. The drive mechanism 42 may then be operated to move the circuit breaker unit to the test position.

As previously explained, the connecting device 28 is engaged by the shaft 38 of the handle 31 when the door is closed. Accordingly, the circuit breaker may be closed when it is in the test position by means of the handle 31, provided the crank 51 is removed to permit the slider 68 and the interlocking plate 63 to be lowered. The circuit breaker may also be electrically operated to close the contact members in the usual manner provided the crank 51 is removed to release the interlocking mechanism. Also, the breaker may be manually operated by means of a handle 99 on the connecting device 28 when the door 16 is opened, provided the interlocking mechanism is released by lowering the interlocking plate 63.

The breaker unit may be moved from the test to the connected position, provided the contact members of the circuit breaker are opened to permit the slider 68 to be raised and the crank 51 to be inserted into the shaft 48. When the circuit breaker unit is in the connected position, its contact members may be closed either manually or electrically, provided the crank 51 is removed and the interlocking plate 63 is actuated to its lowermost position by pushing on the handle 66. The breaker unit may be moved from the connected position to the test position and then to the disconnected position by means of the drive mechanism 42, provided the contact members of the circuit breaker are open.

From the foregoing description, it is apparent that I have provided a metal enclosed switchgear structure in which a removable circuit breaker unit may be mechanically moved within the cell between the disconnected, the test and the connected positions when the door for the cell is closed. The breaker mechanism can be operated in any one of the three positions with the door closed by means of a handle mounted on the exterior of the door. I have also provided mechanical interlocking means for preventing the breaker unit from being moved into or out of the connected or operating position when the contact members of the circuit breaker are closed. The interlocking is positive in operation and relatively simple in construction. Likewise, the drive mechanism is of a relatively simple construction and positive in operation.

Since numerous changes may be made in the above-described construction and different embodiments of the invention may be made without departnig from the spirit and scope thereof, it is intended that all matter contained in the foregoing description or shown in the accompanying drawing shall be interpreted as illustrative and not in a limiting sense.

I claim as my invention:

1. In a switchgear structure, in combination, a cell having a door, a circuit breaker unit disposed in the cell and movable between predetermined positions within the cell, said circuit breaker having contact members operable between open and closed positions, a drive mechanism operable from outside the cell for moving the breaker unit between said positions with the door closed, said door having an opening therein providing access to the drive mechanism, manually operable means for blocking access to the drive mechanism through said opening, and mechanical interlocking means on the breaker unit actuated by the breaker mechanism simultaneously with the circuit breaker contact members when they are opened and closed, said interlocking means engaging the manually operable means to prevent moving the manually operable means away from said opening thereby preventing operation of the drive mechanism while the circuit breaker contact members are closed.

2. In a switchgear structure, in combination, a cell having a door, a circuit breaker unit disposed in the cell and movable between predetermined positions within the cell, said circuit breaker having contact members operable between open and closed positions, a drive mechanism operable from outside the cell for moving the breaker unit between said positions with the door closed, said door having an opening therein providing access to the drive mechanism, manually operable means for blocking access to the drive mechanism through said opening, and mechanical interlocking means on the breaker unit actuated by the breaker mechanism simultaneously with the circuit breaker contact members when they are opened and closed, said interlocking means engaging the manually operable means to prevent closing the circuit breaker contact members while the manually operable means is positioned to permit the drive mechanism to be operated.

3. In a switchgear structure, in combination, a cell having a door, a circuit breaker unit disposed within the cell and movable between connected, test and disconnected positions, contact actuating means on the circuit breaker, a drive mechanism for moving the breaker unit between said positions with the door closed, said door having an opening therein providing access to the drive mechanism, manually operable means for blocking the access to the drive mechanism through said opening, and mechanical means on the breaker unit actuated by said contact actuating means on the circuit breaker when the breaker is opened and closed, said mechanical means engaging said manually operable means to prevent closing the circuit breaker while the manually operable means is positioned to permit the drive mechanism to be operated.

4. In a switchgear structure, in combination, a cell having a door, a circuit breaker unit disposed within the cell and movable between predetermined positions, contact actuating means on the circuit breaker, a drive mechanism for moving the breaker unit between said positions with the door closed, said door having an opening therein providing access to the drive mechanism, manually operable means for blocking access to the drive mechanism through said opening, and mechanical means on the breaker unit actuated by said contact actuating means on the circuit breaker when the breaker is opened and closed, said mechanical means engaging said manually operable means to prevent moving the manually operable means away from said opening thereby preventing operation of the drive mechanism while the circuit breaker is closed.

5. In a switchgear structure, in combination, a cell having a door with an opening therein, a circuit breaker unit disposed in the cell and movable between predetermined positions within the cell, a drive mechanism operable from outside the cell through said opening for engaging the breaker unit to move the unit between said positions with the door closed, manually operable means for controlling the operation of the drive mechanism, and mechanical means pivotally mounted on the circuit breaker and movable with the breaker contacts when they are opened and closed and mechanical means engaging the manually operable means to mechanically block closing the circuit breaker while the manually operable means is positioned to permit the drive mechanism to be operated.

6. In a switchgear structure, in combination, a cell having a door with an opening therein, a circuit breaker unit disposed in the cell and movable between predetermined positions within the cell, a drive mechanism operable from outside the cell through said opening for engaging the breaker unit to move the unit between said positions with the door closed, manually operable means for controlling the operation of the drive mechanism, and mechanical means pivotally mounted on the circuit breaker and movable with the breaker contacts when they are opened and closed, said mechanical means engaging the manually operable means to mechanically prevent operation of the drive mechanism while the circuit breaker is closed.

7. In a switchgear structure, in combination, a cell having a door with an opening therein, a circuit breaker unit disposed within the cell and movable between connected, test and disconnected positions, said circuit breaker having contact members operable between open and closed positions, a drive mechanism for moving the breaker unit between said positions with the door closed, blocking means for controlling operation of the drive mechanism through said opening, a handle extending through the door for actuating the blocking means, an interlocking plate actuated by the handle, and mechanical means actuated simultaneously with the circuit breaker contact members when they are opened and closed, said mechanical means engaging the interlocking plate to prevent moving the plate and the blocking means thereby preventing operation of the drive mechanism while the circuit breaker contact members are closed.

8. In a switchgear structure, in combination, a cell having a door with an opening therein, a circuit breaker unit disposed within the cell and movable between connected, test and disconnected positions, contact actuating means on the circuit breaker, a drive mechanism for moving the breaker unit between said positions with the door closed, blocking means for controlling operation of the drive mechanism through said opening, a handle extending through the door for actuating the blocking means, an interlocking plate actuated by the handle simultaneously with the blocking means, and mechanical means carried by the circuit breaker and actuated by said contact actuating means simultaneously with the breaker contact members to engage the interlocking plate to prevent closing the circuit breaker when the interlocking plate and the blocking means are positioned for operation of the drive mechanism.

9. In a switchgear structure, in combination, a cell having a door with an opening therein, a circuit breaker unit disposed within the cell and having engageable means thereon, contact actuating means on the circuit breaker, a tie rod rotatably mounted in the cell, driving plates secured to the tie rod and disposed to engage said means on the circuit breaker unit to move it in the cell between predetermined positions with the door closed, actuating means accessible through said opening in the door from outside the cell for driving said tie rod, blocking means for controlling operation of said actuating means, a handle extending through the door for actuating the blocking means, an interlocking plate actuated by the handle simultaneously with the blocking means, and interlocking means carried by the circuit breaker and actuated by said contact actuating means to engage the interlocking plate to prevent closing the circuit breaker when the blocking means is positioned for operation of the driving plates.

10. In a switchgear structure, in combination, a cell, a circuit breaker unit disposed in the cell and movable between predetermined positions within the cell, said circuit breaker having contact members operable between open and closed positions, a drive mechanism operable from outside the cell for moving the breaker unit between said positions, blocking means disposed in the cell for preventing access to the drive mechanism, a handle for moving the blocking means to permit operation of the drive mechanism, an interlocking plate actuated by said handle simultaneously with said blocking means, tripping means on the circuit breaker, a lever connected to the tripping means and disposed to be actuated by the interlocking plate to prevent closing the circuit breaker while the drive mechanism is being operated, and mechanical means on the breaker unit actuated simultaneously with the circuit breaker contact members when they are opened and closed, said mechanical means engaging the interlocking plate to prevent moving the plate and the blocking means thereby preventing operation of the drive mechanism while the contact members of the circuit breaker are closed.

11. In a switchgear structure, in combination, a cell, a circuit breaker unit disposed in the cell and having engageable means thereon, said circuit breaker having contact members operable between open and closed positions, a tie rod rotatably mounted in the cell, spaced driving plates secured to the tie rod and disposed to engage said means on the breaker unit to move it horizontally between predetermined positions within the cell, a drive shaft for actuating said plates, blocking means disposed in the cell for controlling operation of the drive shaft, a handle for moving the blocking means to permit operation of the drive shaft, an interlocking plate actuated by said handle simultaneously with said blocking means, tripping means on the circuit breaker, a lever connected to the tripping means and disposed to be actuated by the interlocking plate to prevent closing the circuit breaker while it is being moved between said predetermined positions and mechanical means on the breaker unit actuated simultaneously with the circuit breaker contact members when they are opened and closed, said mechanical means engaging the interlocking plate to prevent moving the plate and the blocking means thereby preventing operation of the drive shaft while the contact members of the circuit breaker are closed.

12. In a switchgear structure, in combination, a cell, a circuit breaker unit disposed in the cell and having engageable means thereon, said circuit breaker having contact members operable between opened and closed positions, a tie rod rotatably mounted in the cell, spaced driving plates secured to the tie rod and disposed to engage said means on the breaker unit to move it horizontally between predetermined positions within the cell, a rotatable drive shaft connected to one of said plates for actuating the plates, said shaft having one end accessible from outside the cell, blocking means disposed in the cell for preventing access to said end of the drive shaft, a handle for moving the blocking means to permit operation of the drive shaft, an interlocking plate actuated by said handle simultaneously with said blocking means, mechanical means on the breaker unit actuated simultaneously with the circuit breaker contact members when they are opened and closed, said mechanical means engaging the interlocking plate to prevent moving the plate and the blocking means thereby preventing operation of the drive shaft while the contact members of the circuit breaker are closed, and said interlocking plate engaging the mechanical means to prevent closing the contact members of the breaker while the drive shaft is being operated to move the breaker unit.

13. In a switchgear structure, in combination, a cell having a door with an opening therein, a circuit breaker unit disposed within the cell and having engageable means thereon, said circuit breaker having contact members operable between open and closed positions, a tie rod rotatably mounted in the cell, spaced driving plates secured to the tie rod and disposed to engage said means on the breaker unit to move it horizontally in the cell between predetermined positions with the door closed, a drive shaft for actuating said plates, said shaft having one end accessible through said opening in the door from outside the cell with the door closed, blocking means for preventing access to said one end of the drive shaft, an interlocking plate actuated simultaneously with said blocking means, mechanical means actuated simultaneously with the circuit breaker contact members when they are opened and closed, said mechanical means engaging the interlocking plate to prevent moving the plate and the blocking means thereby preventing operation of the drive shaft while the contact members of the circuit breaker are closed, and a position indicator actuated by one of said plates for indicating the position of the breaker unit within the cell.

14. In a switchgear structure, in combination, a cell having a door, a circuit breaker unit disposed within the cell and movable between connected, test and disconnected positions, said circuit breaker having contact members operable between open and closed positions, a drive mechanism operable from outside the cell for moving the breaker unit between said positions with the door closed, said door having an opening therein providing access to the drive mechanism, manually operable means for blocking access to the drive mechanism through said opening, mechanical means carried by the circuit breaker and actuated simultaneously with the circuit breaker contact members when they are opened and closed, said mechanical means engaging the manually operable means to prevent closing the circuit breaker while the manually operable means is positioned to permit the drive mechanism to be operated, and an indicator for indicating whether the circuit breaker is closed or open, said indicator being actuated by said mechanical means on the circuit breaker.

15. In a switchgear structure, in combination, a cell having a door, a circuit breaker unit disposed within the cell and movable between connected, test and disconnected positions, said circuit breaker having contact members operable between open and closed positions, a drive mechanism operable from outside the cell for moving the breaker unit between said positions with the door closed, said door having an opening therein providing access to the drive mechanism, manually operable means for blocking access to the drive mechanism through said opening, mechanical means actuated by the circuit breaker, simultaneously with the contact members when they are opened and closed, said mechanical means engaging the manually operable means to prevent moving said manually operable means thereby preventing operation of the drive mechanism while the circuit breaker is closed, an indicator for indicating whether the circuit breaker is closed or open, and a bracket pivotally mounted in the cell and engaged by said mechanical means to actuate said indicator.

References Cited in the file of this patent

UNITED STATES PATENTS

| | | |
|---|---|---|
| 1,791,446 | French | Feb. 3, 1931 |
| 2,129,723 | Wood | Sept. 13, 1938 |
| 2,273,002 | Mahoney | Feb. 10, 1942 |
| 2,376,471 | Bevan | May 22, 1945 |
| 2,388,934 | Pearson | Nov. 13, 1945 |
| 2,443,664 | Rothfus | June 22, 1948 |
| 2,540,814 | Eichelberger | Feb. 6, 1951 |
| 2,563,441 | Wood et al. | Aug. 7, 1951 |
| 2,611,838 | Goessel | Sept. 23, 1952 |

FOREIGN PATENTS

| | | |
|---|---|---|
| 348,312 | Great Britain | May 14, 1931 |